Figure 1:
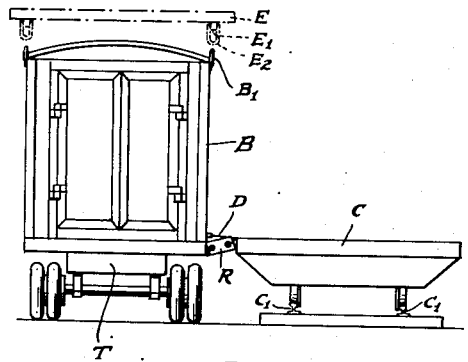

July 25, 1939.   B. F. FITCH   2,166,948
MECHANISM FOR HOLDING DEMOUNTABLE BODIES ON VEHICLES
Filed July 18, 1935   5 Sheets-Sheet 1

INVENTOR.
Benjamin F. Fitch
BY
Bates, Golrick & Hears
ATTORNEYS.

July 25, 1939.    B. F. FITCH    2,166,948
MECHANISM FOR HOLDING DEMOUNTABLE BODIES ON VEHICLES
Filed July 18, 1935    5 Sheets-Sheet 2

INVENTOR.
Benjamin F. Fitch
BY Bates, Goldrick & Teare
ATTORNEYS.

July 25, 1939.　　　　B. F. FITCH　　　　2,166,948
MECHANISM FOR HOLDING DEMOUNTABLE BODIES ON VEHICLES
Filed July 18, 1935　　　5 Sheets-Sheet 3

INVENTOR.
Benjamin F. Fitch,
BY Bates, Golnick & Fean
ATTORNEYS.

July 25, 1939. B. F. FITCH 2,166,948
MECHANISM FOR HOLDING DEMOUNTABLE BODIES ON VEHICLES
Filed July 18, 1935 5 Sheets-Sheet 4

INVENTOR.
Benjamin F. Fitch,
BY
Bates, Goldrick & Tear
ATTORNEYS.

July 25, 1939.   B. F. FITCH   2,166,948
MECHANISM FOR HOLDING DEMOUNTABLE BODIES ON VEHICLES
Filed July 18, 1935   5 Sheets-Sheet 5

INVENTOR.
Benjamin F. Fitch
BY
Bates, Golrick & Teare
ATTORNEYS.

Patented July 25, 1939

2,166,948

UNITED STATES PATENT OFFICE 2,166,948

MECHANISM FOR HOLDING DEMOUNTABLE BODIES ON VEHICLES

Benjamin F. Fitch, Greenwich, Conn., assignor to Motor Terminals, Inc., Cleveland, Ohio, a corporation of Ohio Application July 18, 1935, Serial No. 32,029

31 Claims. (Cl. 105—366)

The present invention relates to mechanism for holding demountable bodies on vehicles or carriers, and if desired locking them thereto, and is a continuation in part of my copending application for Letters Patent, filed December 3, 1934, Serial No. 755,752, now Patent No. 2,127,480 issued August 16, 1938.

The present invention is especially adapted for use in a transfer system, where freight is stored in removable bodies which are handled as a unit and transferred from an automotive vehicle to a railway car or shipper's platform, or vice versa. Such a transfer system may employ overhead travelling cranes for raising and transferring the bodies, but I prefer to supplement this at minor points of interchange,—that is, where only occasional transfers are made,—by mechanical surface interchange of a body between the carrier and the platform, or between carriers. Such surface interchange may include the use of rails secured to the underside of the body and adapted to slide along suitable guideways on the carrier and the platform.

Such a system for freight transfer is described in detail in my patent above mentioned.

One of the objects of the present invention is to provide an improved mechanism for positioning and locking the demountable body on a carrier or platform, and to so arrange this mechanism that it may be utilized in any type of transfer system which may be used and especially in conjunction with both overhead crane and surface types of interchanges.

It is also an object of this invention to provide the carriers with guides which may coact with rails carried by the body to guide the body for sliding movement between carriers, or between a carrier and a platform, which guides are yieldingly mounted on the carrier as an insurance against shocks to the contents of the bodies during the transportation of the bodies on the carrier.

Other objects of the present invention will become more apparent from the following description, reference being had to the accompanying drawings, in which the yielding mounting of the guides and an improved form of locking mechanism are illustrated. The essential features and characteristics of the invention will be set forth in the claims.

Figure 2:
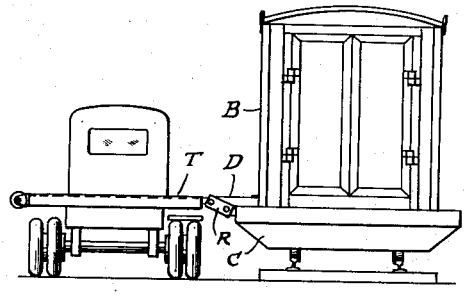
Figure 3:
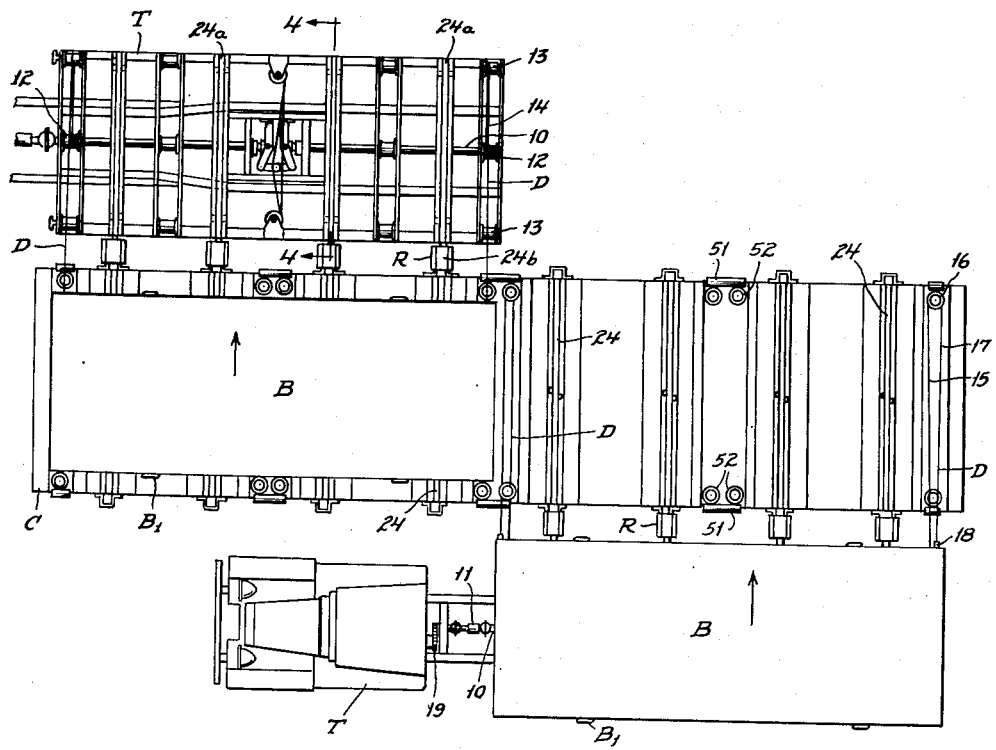
Figure 4:
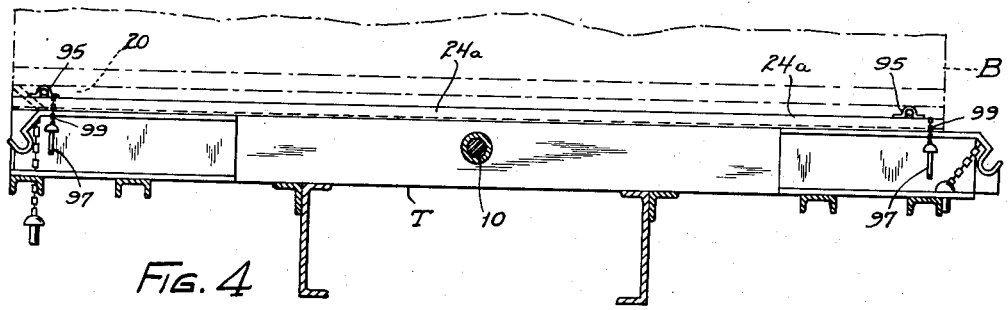
Figure 5:
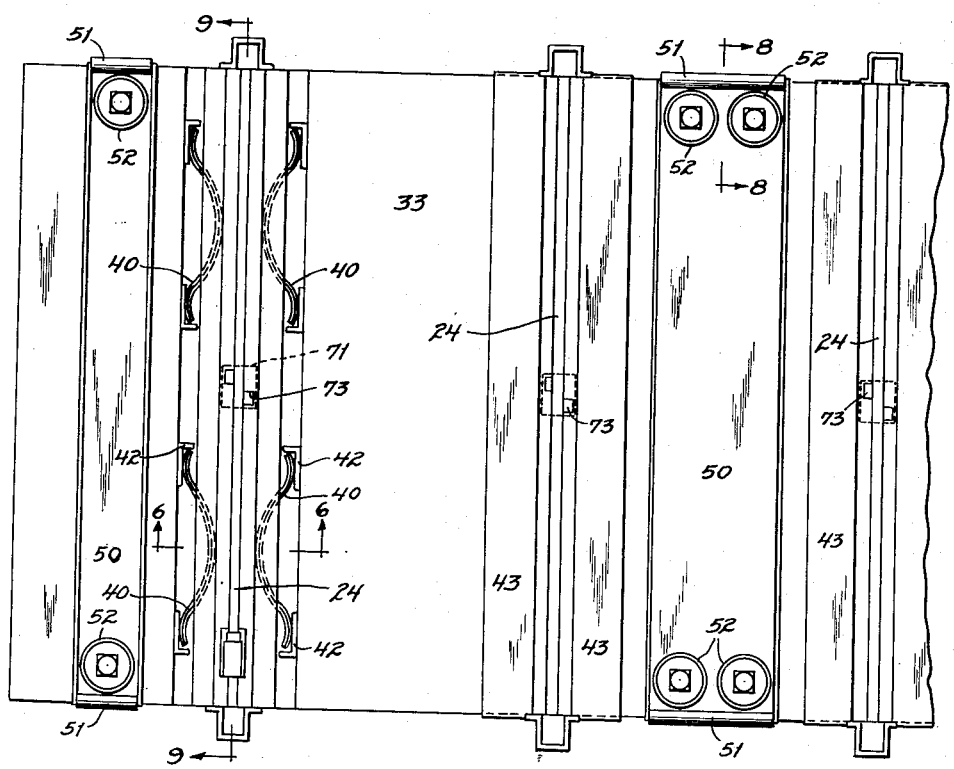
Figure 6:
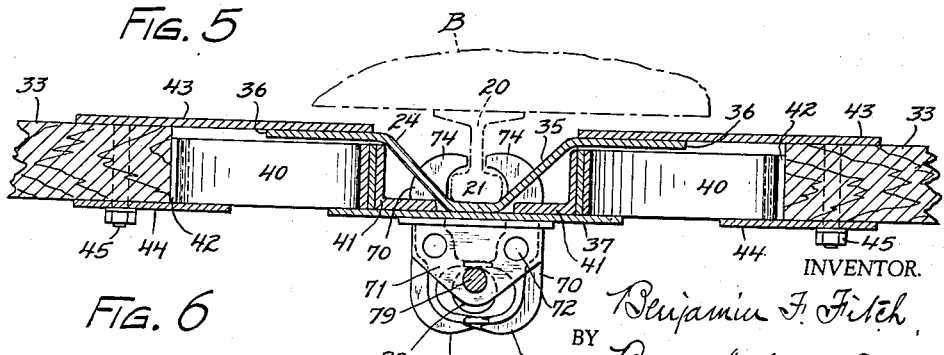
Figure 8:
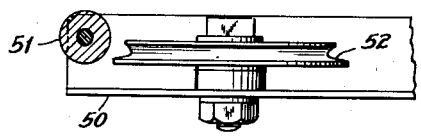
Figure 7:
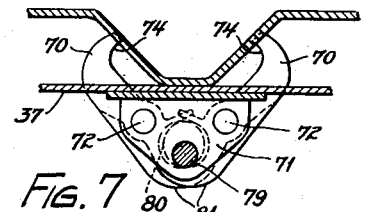
Figure 9:
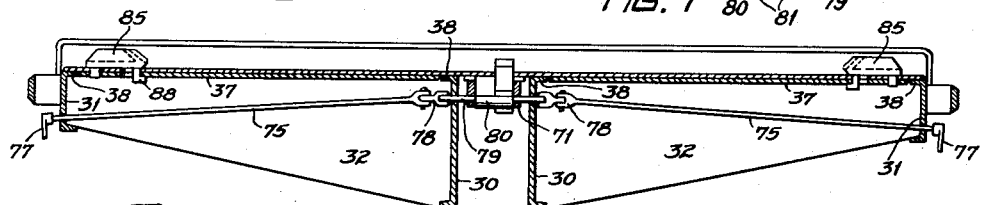
Figure 10:
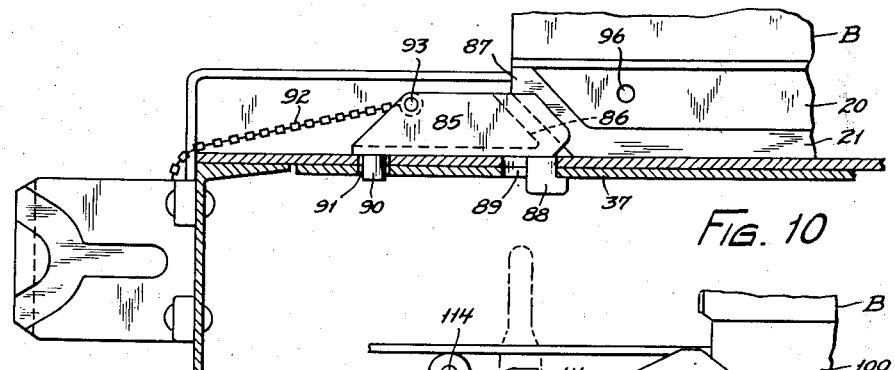
Figure 12:
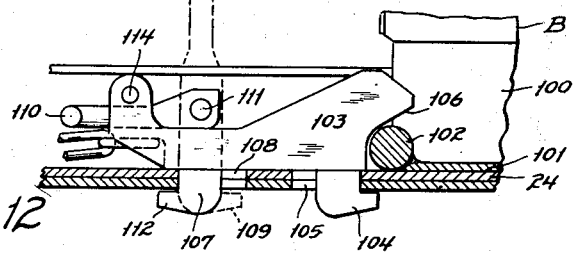
Figure 11:
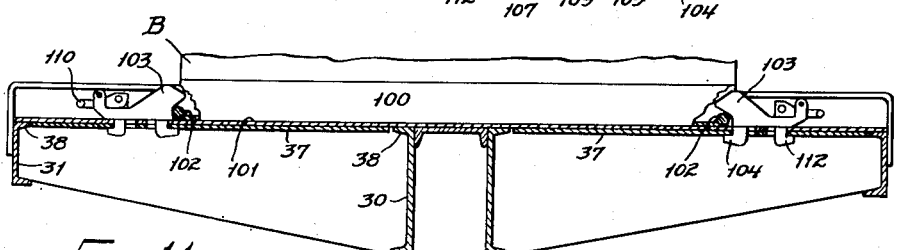
Figure 13:
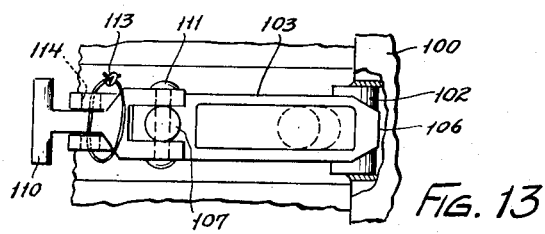
Figure 14:
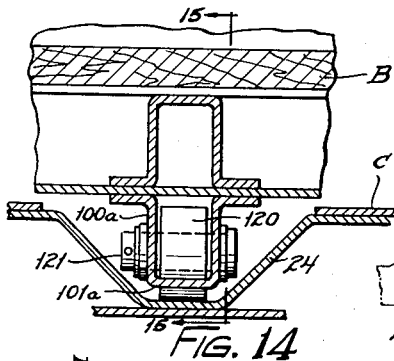
Figure 15:
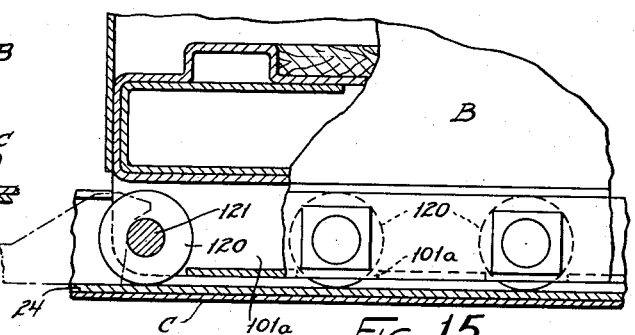
Figure 16:
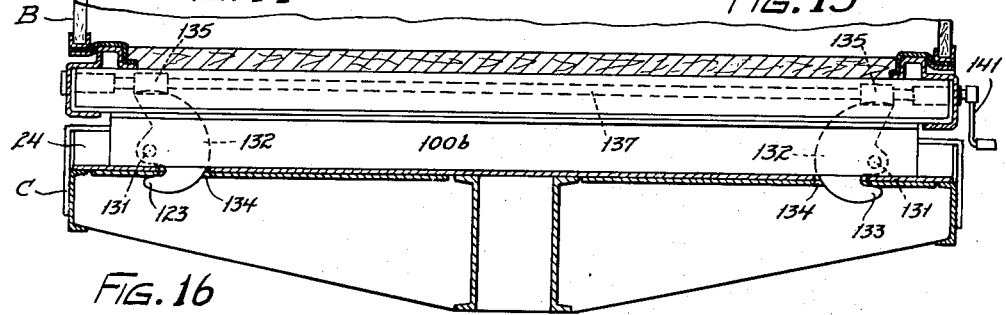
Figure 17:
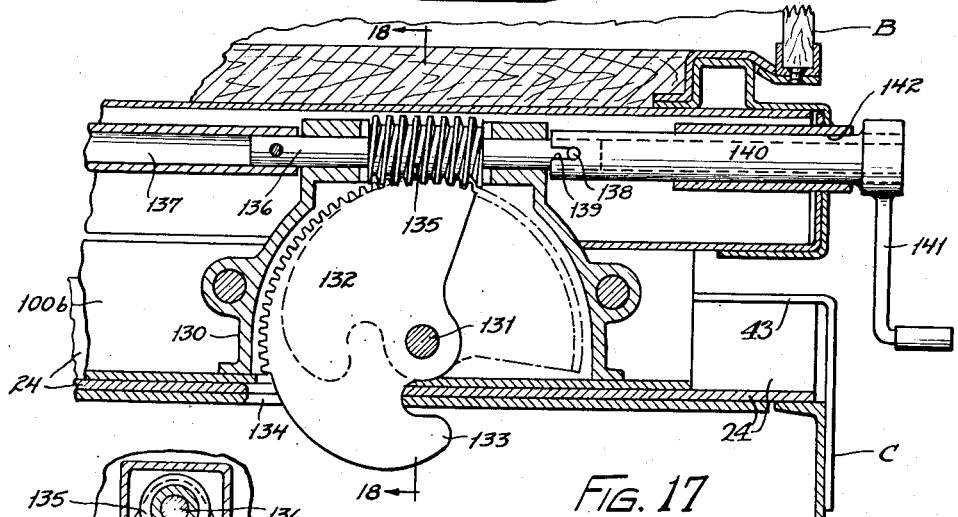
Figure 18:
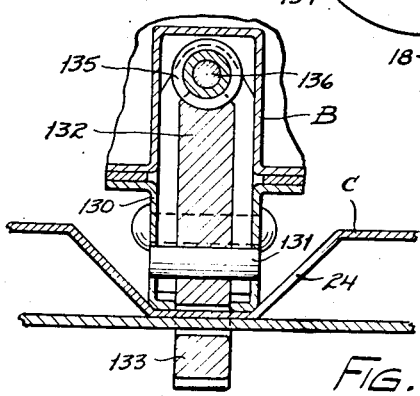
Figure 19:
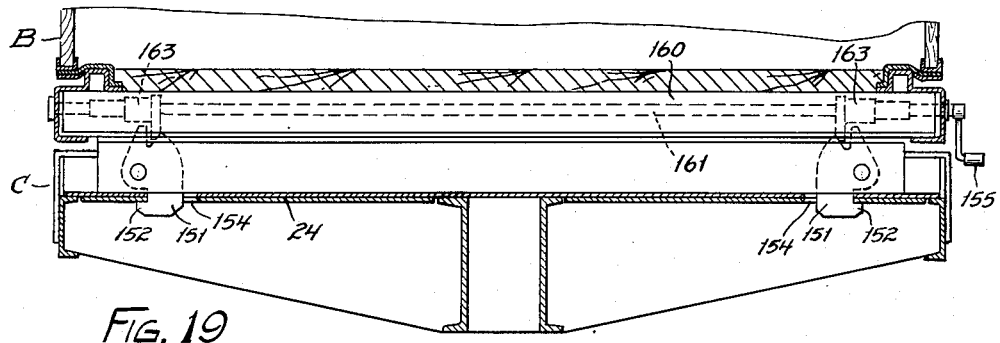
Figure 20:
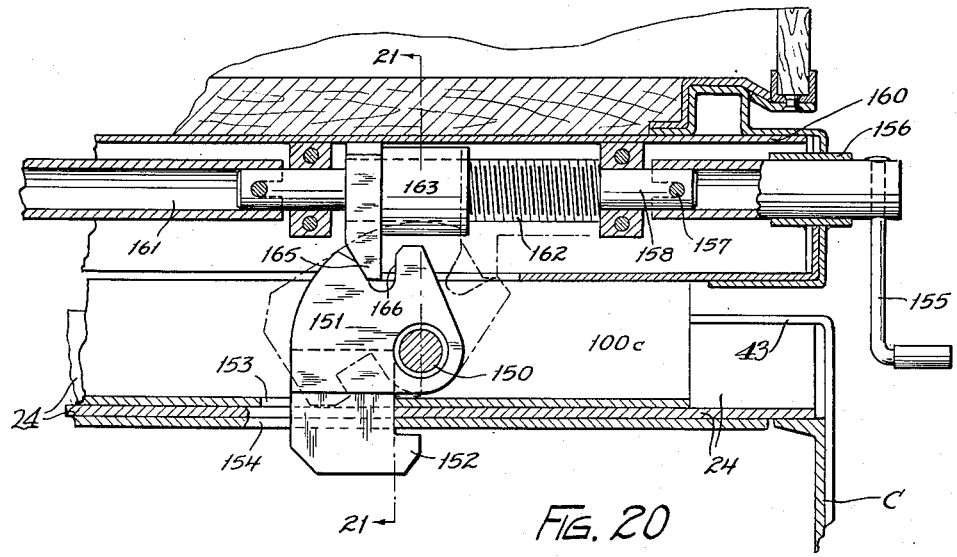
Figure 21:
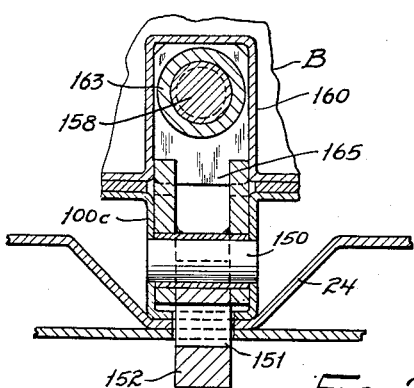

In the drawings, Fig. 1 illustrates in end elevation a truck having a removable body thereon, and a railway car, likewise in end elevation, to which the body is to be transferred; Fig. 2 is a view, similar to Fig. 1, illustrating, however, the body in position on the railway car, and the truck alongside, ready to receive it; Fig. 3 is a plan view, illustrating the railway car with a trailer and tractor unit at either side thereof, one of the trailers having a body positioned thereon for transfer to the car, while the car carries a body for transfer to the other trailer; Fig. 4 is a transverse sectional view, through the trailer, as indicated by the line 4—4 on Fig. 3; Fig. 5 is a fragmentary plan on an enlarged scale of a portion of a railway car, certain members being removed to more clearly illustrate the internal construction thereof; Fig. 6 is a fragmentary vertical section, as indicated by the line 6—6 on Fig. 5; Fig. 7 is a view, similar to Fig. 6, illustrating certain of the mechanism in a different position; Figs. 8 and 9 are vertical sections, as indicated by the correspondingly numbered lines on Fig. 5; Fig. 10 is an enlarged sectional detail, illustrating a removable body in position on the car, the plane of the section being substantially the same as the plane of Fig. 9; Fig. 11 is a section taken in substantially the same plane as Fig. 9, but illustrating a modified form of mechanism for securing the removable body in position on the vehicle; Fig. 12 is an enlarged sectional detail of the locking mechanism illustrated in Fig. 11; Fig. 13 is a fragmentary plan of the locking mechanism shown in Fig. 12; Fig. 14 is a detail illustrating a modified form of the body, wherein rollers are used to minimize the frictional resistance between the container and its guideway; Fig. 15 is a transverse section, the plane of the section being indicated by the line 15—15 on Fig. 14; Fig. 16 is a sectional detail of a modified form of locking mechanism, the plane of the section being substantially that as indicated by the line 9—9 on Fig. 5; Fig. 17 is an enlarged sectional detail of the locking mechanism illustrated in Fig. 16; Fig. 18 is a sectional detail as indicated by the line 18—18 on Fig. 17; Fig. 19 is a transverse section through the railway car, taken in substantially the same plane as Fig. 16, but illustrating another form of locking mechanism; Fig. 20 is an enlarged sectional detail of the locking mechanism shown in Fig. 19; Fig. 21 is a sectional detail, as indicated by the lines 21—21 on Fig. 20.

As heretofore mentioned, my system for handling freight contemplates the transferring of removable containers or bodies between a truck, a trailer, and a railway car. As shown in Fig. 1, I have illustrated a railway car C, supported by rails Cl on the usual road bed. Adjacent to and parallel with the car is a truck or trailer T, having a removable container or body mounted thereon.

At major points of interchange, suitable cranes E, indicated at dotted lines in Fig. 1, and carried by suitable overhead trackways (not shown), and provided with suitable lifting cables E1, each of which carries a clevis E2 arranged to engage hooks B1 which are carried by the container to raise the body from the truck and move it laterally along the trackway, to a position over the railway car, whereupon the cables are unwound, lowering the body into position on the car.

At minor points of interchange, that is, where it is desirable to eliminate the expense of permanent crane installations, the body is slid or skidded between a truck or trailer and the car. It will be noted from Fig. 1 that the truck has been positioned adjacent the railway car, and suitable bridge members or ramps R have been interconnected between the trailer and the car. For a detailed description of such a ramp, as well as the connection between the ramp and the trailer and car, reference may be had to my copending application heretofore referred to.

The body B is skidded from the flat car C across the ramps R into position on the trailer by a suitable power mechanism carried by the truck and operatively connected with winding drums on the latter. As illustrated in Fig. 3, the trailer is provided with a suitable power shaft 10, which is connected to the power plant of the truck or tractor by a power connecting device 11, and controlled by a transmission or clutch mechanism 19 carried by the truck. The power shaft 10 of the trailer is provided with a plurality of cable-winding drums 12 to which cables D are secured. The arrangement is such that the cables may pass from the drums 12 around suitable sheaves 13 carried adjacent the outer sides of the truck body, as indicated at 14 in Fig. 3, thence around such sheaves 13 across the truck and attached to the body B in any suitable manner. Hence, as the power shaft is rotated, the body will be drawn onto the trailer.

When it is desired to transfer the body from the truck to the railway car, the cables pass from the drums 12 across the car floor, as indicated at 15 in Fig. 3, and are reeved about suitable sheaves 16 carried on the car floor and then stretched across the car floor, as indicated at 17, and are fastened to the body as at 18. Hence, consequent upon the rotation of power shaft 10, the mechanism will operate to slide the body B (Fig. 3) in the direction of the arrow from the truck onto the car floor.

While I have illustrated and described a construction wherein the body is moved to or from the truck by a transverse movement, that is, by moving it across the side of the truck, it is obvious that I may so arrange the guides on the truck that the bodies may be moved to and from the truck by a longitudinal movement across the end of the truck.

The body B preferably comprises a rectangular container having suitable side and end walls supported by a base frame. Rigidly secured to the base frame, extending transversely across the body, are a series of inverted rails 20, such rails being best illustrated in Figs. 4, 6 and 10. As there shown, the heads 21 of the rails are arranged to slide in guideways 24 of the car and similar guideways 24a on the trailer. The ramps R are provided with similar guideways 24b, such guiding elements serving to maintain the body in proper angular position on the carrier and providing surfaces which may be greased in the usual manner to coact with the body rails 20 to eliminate, to a certain degree, the friction between the bottom of the container and the carrier.

The guideways 24 of the railway cars, which coact with the rails 20 of the body to guide it into position on the carrier, are so arranged that they may be well installed on existing flat cars. I have shown, as is indicated in Figs. 5 and 9, a railway car, which comprises center sills 30 and side sills 31, connected by suitable braces, gussets and plates 32. The sill members 30 and 31 ordinarily support planking 33, the planks of which extend crosswise of the car. My guiding channel mechanism is so arranged that I merely may remove certain of the planks and substitute such guiding mechanism as a unit therefor.

As illustrated in Fig. 6, the guiding channel 24 comprises a metal plate having a V-shaped trough 35, the base of which is of sufficient width to accommodate the head 21 of the body rail 20. From the base of the trough the walls of the channel slope upwardly and outwardly, terminating in outwardly extending flanges 36. The guiding trough 24 extends, as shown in Figs. 5 and 9, from one side sill 31 to the other, and is supported intermediate its ends by the center sill members 30 and is reenforced by suitable reenforcing plate members 37. These plate members are so arranged that the guides 24 are restrained from material endwise movement by the flange 38 of the sill members 30 or 31, which coact with the ends of the reenforcing plates 37.

As the bodies are generally shifted between the carriers at major points of interchange, an overhead crane mechanism will ordinarily be used. In such instances, I find it desirable to have the side walls of the body guides 24 sloped, as shown in Fig. 6, so that consequent of the lowering of the body into position on the car, an accurate positioning may be obtained due to the camming action between the sloping walls of the guide member and the head of the body rail 20.

When a body is in transit on a railway car, it has been found that sudden start or stopping of the train or car causes a jolting or jerking of the body, which, in turn, causes an impact between the goods carried in the body and the ends thereof, sometimes resulting in damage to the goods and to the end walls of the container. I have found that the tendency for such impact is decidedly lessened by so mounting the body that it may move longitudinally of the car and by inserting a shock-absorbing device, such as a spring, between the body support and the stationary parts of the car. I likewise find that by providing for this longitudinal movement of the guideway, I also aid the placing or positioning of the body on the car, since not only is it possible to cam the body by the sloping side walls of the guide 24, but the walls themselves may likewise move to a certain extent, due to the camming action, to position the guides beneath the body.

As shown in Figs. 5 and 6, I have mounted the guides 24, together with the reenforcing plates 37, for sliding movement longitudinally of the car on the sill members 30 and 31, and I normally restrain the guide against longitudinal movement by suitable springs 40, which are positioned between angle members 41, secured to the guideway reenforcing plates 37, and angle members 42 carried by the car floor. The springs 40 are restrained against transverse movement relative to the car by the members 42, which engage the ends of the springs. The springs are restrained against vertical movement by the overhanging lips 36 of the guideway, the reenforcing plates 37, and suitable cover plates 43 and 44, which are secured to the top and bottom surfaces of the car floor respectively by suitable bolts 45. The upper cover plates 43 extend inwardly toward and overlap respective outwardly extending flanges 36 of the guideway 24, thereby providing a substantially continuous floor.

As heretofore mentioned, when a body is to be slid from the trailer onto the car, the cables D pass over the guiding drums 13 next adjacent to the car and are wrapped around suitable sheaves 16 carried by the car and at their outermost ends are secured to suitable attaching devices on the body. As shown in Figs. 5 and 8, I remove from the car floor several of the planks and insert in their place a pan-shaped member 50, which carries adjacent its ends rollers 51, extending longitudinally of the car, and a pair of sheave members 52. Hence, when the body is to be moved from the trailer to the car, each cable may pass over one of the rollers 51 to the far side of the car around a sheave 52 and back over the roller 51 to the attaching device 18 on the body.

As heretofore mentioned, the present invention is especially concerned with an improved mechanism for locking the body or container in position on the car, so as to avoid undue shifting of the body in transit. As shown in Figs. 5 and 7 I have provided, for this purpose, a locking mechanism arranged to engage the head 21 of the body rail 20 to prevent creeping of the body rail out of the trough shape guiding member 24. As there shown, such locks comprise a pair of locking members 70 pivoted at 72 to a bracket 71 which is secured to the underside of the plate 37. The locking members 70 have arms arranged to extend upwardly through openings 73 in the side walls of the guide member 24 and are provided at their upper ends with hook-like formations 74 arranged to embrace the head 21 of the body skid rail, thereby preventing upward movement of the body.

The locking members 70, while positioned adjacent the center of the car, are arranged to be operated from the sides. In Fig. 9 I illustrate a pair of operating rods 75, which extend from the brackets 71 to the side walls of the car where they are provided with removable handles 77, which may have a peculiarly shaped socket arrangement at the end of the bar, so that the handles may be removed and carried by the truck and thereby provide a lock mechanism which prevents pilferage of the container.

The inner ends of the pair of rods 75 are connected by universal couplings 78 with a shaft 79 mounted in the bracket members 71. This shaft is provided with a cam portion 80 arranged to be engaged by lower forked extensions 81 of the locking members 70. It results, that when the cam is rocked from the position shown in Fig. 6 to the position shown in Fig. 7 the locking members will be rocked about their pivots 72 to disengage the hook portions 74 thereof from the rail, thereby releasing the container.

The container may be prevented from transverse movement on a railway car by wedge members or blocks 85, which, as shown in Fig. 10, have inclined surfaces 86 arranged to engage an inclined end 87 of the body rails 20. The wedge 85 is preferably provided with a depending hook 88 arranged to be removably inserted in an elongated slot 89 on the car surface. The block is then shoved toward the container until the hook engages the underside of the plate member 37, heretofore described, whereupon a lug 90 at the rear of the block enters an opening 91 in the plate 37; such opening being of substantially the same diameter as the pin 90, endwise movement of the block and body is prevented. A suitable chain 92 may be connected to the car and to a pin 93 on the wedge, thereby preventing the loss of the wedge.

It will be noted that due to the inclination 87 of the ends of the body rail, which coacts with the block 85, the container could not be totally slid from the car, even though the block were removed, as during the sliding movement the inclined head would strike a locking member 70, heretofore mentioned. Further movement of the container would then be prevented, thereby preventing the complete removal of the container until such time as the operating mechanism for the locking members 70 has been actuated.

In Figs. 4 and 10 I have indicated one form of mechanism for preventing movement of the containers while they are on the trailer. As there shown, I may secure to the upper flanges of the trailer channel members 24a, suitable brackets 95 and I provide the body rail 20 with an opening 96, which, when aligned with the brackets 95, may receive a pin 97 arranged to pass through the brackets and be retained therein by a cotter in the usual manner. Both the cotter pin and the locking pin may be secured to the trailer chassis in any suitable way, such as by chains 99.

I have described the container as having a rail mounted in the bottom thereof. In the construction illustrated in Figs. 1 to 10, such rail comprises a light weight railway rail. I may, however, form such rail of pressed metal. In Figs. 11 to 13 I show, secured to the underside of the body, a U-shaped pressed metal rail 100, the face 101 of which engages the guide channels in either carrier. At the ends of this rail I have welded rods or bars 102 which serve to direct or cam the body upwardly, as it is transferred from a car to a trailer across the bridge member.

When the hollow rail 100 is used, I provide a modified form of locking mechanism which engages the bar 102 of such rail. This lock comprises a wedge block 103 having a hook 104 arranged to be inserted in an elongated opening 105 in the car surface and shoved toward the container until the nose 106 of the wedge engages the bar 102. In this position the hook 104 will underlie the guideway channel 24, and a pin 107, pivotally carried in the block, will enter and project through an elongated opening 108 in the car surface, as illustrated by the dotted lines 109 in Fig. 12. Pivotally mounted on the upper end of the pin is a handle 110, which may be used to turn the pin in the block, bringing the hooked foot 112 thereof into engagement with the undersurface of the guideway 24, whereupon the handle may be rocked about its pivot 111 from the dotted line position to the full line position (shown in Fig. 12) and a car seal such as is indicated at 113 in Fig. 13 may be passed through suitable openings 114 in the bracket member 103, thereby retaining the handle sealed in a locked position.

To facilitate the sliding of the container, by eliminating as much friction as possible, I may desire to provide the container with rollers. As shown in Fig. 14, I may mount a plurality of rollers 120 on shafts 121, which may be secured by welding or any other suitable means to the channels or pressed metal rails 100a. The lower portion of the rollers extend through suitable openings in the bottom walls 101a of the channels engaging the guideways 24.

The locking mechanisms heretofore described have been arranged to be carried by the carriers. I find it advantageous in certain instances, to provide a locking mechanism which may be carried by or built into the container. Such a mechanism is illustrated in Figs. 16 to 18. As there shown, I secure in the body rails 100b, adjacent either end thereof, a gear housing 130, within each of which I journal a shaft 131 on which I mount a segmental worm gear 132, having, at one end thereof, a hook 133 arranged to enter a recess 134 in the guide channels 24 of the carriers and engage the undersurface thereof. The hooks 133 of the respective segmental gears extend in opposite directions, whereby the body may be locked, on the car, against movement in any direction.

To operate the segmental gears 132, I provide a pair of worms 135 arranged to mesh with the worm teeth of the segmental gear members. I prefer to mount the worms 135 on transversely extending shafts 136 which are interconnected by a suitable tube 137 and have at their outer ends pins 138 arranged to be engaged by slots 139 in one end of a tubular shaped socket member 140. The socket member is provided with a suitable handle 141 arranged to be removably inserted in a guideway 142 in the body. Hence, when the handle 141 is removed, operation of the segmental gear will be prevented and the body locked in position on the car. When such locking mechanism is used, the guide rails of the trailers will be provided with slots similar to the slots 134 in the guides of the car, whereby such locking mechanism may be used in connection with both the trailer and the truck.

Figs. 19 to 21 inclusive illustrate a modified form of locking mechanism carried by the body skid rail, and just described. In this modification, a pair of shafts 150 are mounted in the hollow body skid rails 100c adjacent the opposite ends thereof. Mounted on each shaft 150 is a locking member 151 having a hook 152 arranged to be projected through openings 153 and 154 in the body skid rail and guideway 24 respectively, consequent upon the swinging of the locking members about their respective shafts. The hooks 152 are, as shown in Fig. 19, oppositely disposed relative to each other, and engage the ends of the slots 154, as well as the underside of the guideways, thereby preventing movement of the body in any direction.

The clamping hooks may be operated from either side of the body by a suitable operating crank 155 arranged to be inserted by the operator, into a suitable sleeve 156 carried by the container frame and having slots arranged to detachably engage a pin 157 of an operation shaft 158 in the usual manner. I prefer to provide an operating shaft 158 for each hook member 151. These shafts are suitably journalled within a body frame member 160 and are drivingly interconnected by a sleeve 161. Each shaft is provided intermediate its ends with threads 162 which coact with a nut 163, which is restrained from rotation by the walls of the body frame member 160.

The nuts 163 operate to swing the clamping hooks into and out of locking engagement with the guides 24. Each nut has a downwardly extending lug or ear 165 arranged to engage the walls of a recess 166 formed in the respective hook member 151 and act to rock the clamp consequent upon the rotation of the crank 155. The threaded shafts 158 serve to effectively lock the clamps 151 against inadvertent displacement.

While I have described some of the locking mechanisms as mounted on the body, some of them on the truck and some on the car, it is obvious that any of these mechanisms may be mounted on any of such three units, as desired. The operating members for the locks may be adapted to receive a special shaped socket or crank which may be retained by the truck driver, thereby preventing the operation of the locks during the transit of the container.

I claim:

1. The combination of a vehicle having upwardly facing open ended channels, a demountable freight container having downwardly facing rails having enlarged heads adapted to register with the bottom of said channels, said channels having openings through both side walls and locking devices arranged to project through the openings in the walls thereof and coact with the body rails, said locking devices comprising a pair of hook members arranged to hook over the edges of the heads of said rails and manually operable means including a cam for operating said locking devices.

2. The combination with a vehicle, of a demountable freight container having rails on its underside, arranged to engage the floor of the vehicle, a locking device carried by said vehicle and comprising a pair of members pivotally connected to the vehicle beneath the floor surface thereof and arranged to engage said rail to prevent upward movement of the container and provided with yokes, and a cam carried by the vehicle and arranged to coact simultaneously with both yokes to move the members into and out of coacting position with said rails.

3. The combination with a removable freight container, provided with downwardly depending rails to facilitate sliding of the container from one position to another, a hook member mounted at each end of said container and arranged to project through openings in the rails and enter openings in the surface supporting the container, whereby said container may be locked consequent upon movement of said hook.

4. The combination with a vehicle having elongated guides thereon, a demountable freight container having rails secured to its under surface and arranged to engage said guides, and locking mechanisms carried by said rail adjacent opposite ends thereof to secure the container against movement in said guides, said locking mechanisms including oppositely facing hooks arranged to engage and disengage abutments on said guides, and actuating means for the hooks to cause such engagement and disengagement.

5. The combination with a vehicle having elongated guides thereon, a demountable freight container having hollow rails secured to its underside and arranged to slidably engage said guides, and a locking mechanism carried within said rail at both ends thereof, and arranged to cooperate with the guides to prevent movement of the container, and a common operating mechanism for both locks.

6. The combination with a removable freight container provided with downwardly depending hollow rails to facilitate skidding or sliding of the container from one position to another, a hook member mounted at each end of said container within said rails, and arranged to project through openings of the rails and openings in the supporting surface for the container, whereby said container may be locked consequent upon movement of said hook, said hook being arranged to be withdrawn within the confines of said rail while the container is being moved from place to place.

7. The combination with a removable freight container having a hollow frame member and provided with downwardly depending hollow rail to facilitate sliding of the container from one position to another, a locking device within said hollow rail and arranged to selectively project through openings in the rail and enter openings in the surface supporting the container, whereby said container may be locked consequent upon movement of said hook, and operating means for said locking device carried by said hollow frame member and operable from the end of the container.

8. The combination with a demountable body having downwardly extending hollow rails to facilitate the sliding of the container from one position to another, a pair of locking members mounted on the body within the rails adjacent the opposite ends thereof, said locking members being provided with oppositely extending hooks arranged to enter openings in the supporting surfaces for the container which openings are spaced parallel to the rails, to secure the container against movement relative to said surfaces, a pair of horizontally disposed threaded members carried by said container and operatively connected to said locking hook, and a common operating means for said threaded members to move said hooks into and out of locking position.

9. The combination of a container, a hollow rail on the underside of the container, a hook pivotally mounted within the rail and adapted to project downwardly through an opening in the bottom of the rail, a rotatable shaft extending at right angles to the pivot of the hook carrying a helix, and means to operate the hook by the helix.

10. The combination with a demountable body having downwardly extending rails to facilitate the sliding of the container from one position to another, a pair of segmental gear members mounted adjacent the opposite ends of the car and pivoted to the body rail, said segmental gears being provided with oppositely extending hooks arranged to enter openings in the supporting surfaces for the container to secure the container against movement relative to said surfaces, a pair of worm gears carried by said container and meshing with said segmental gears, and a common operating means for said worm gears to move said hooks into and out of locking position.

11. Means for locking a demountable container to a support, comprising a pivoted hook, a rotatable shaft extending at right angles to the pivot of the hook, sa:'. shaft carrying a screw thread, a traveling nut on said screw thread, and interengaging formatio..s on the nut and hook whereby the rotation of the shaft may rock the hook.

12. The combination with a demountable body having downwardly extending rails to facilitate the sliding of the container from one position to another, a pair of oppositely facing hooks mounted adjacent the opposite ends of the body and pivoted to the body rail, said hooks arranged to enter openings in the supporting surfaces for the container to secure the container against movement relative to said surfaces, a shaft on said container carrying screw threads, a pair of travelling nuts on said threads operatively engaging said hooks, and means to prevent rotation of said nuts.

13. The combination of a vehicle and a demountable freight container adapted to be mounted thereon, cooperating guides on the upper side of the vehicle and the lower side of the container positioned to guide the container to and from the vehicle in a direction transverse to the normal direction of travel of the vehicle, and means for yieldingly resisting a skewing movement of one of said guides.

14. The combination of a car, transverse guides on the top side thereof adapted to coact with guides on the bottom side of a demountable body for transverse movement of said body to and from the car, said guides on the car being arranged for limited movement longitudinally of the car and independent of each other.

15. The combination of a vehicle, a demountable freight container adapted to be mounted thereon, cooperating transverse guides on the top side of the vehicle and bottom side of the freight container to guide the container to and from the vehicle in a horizontal movement, one of said guides being adapted for limited movement transversely of the length of the guide for an individual skewing movement, and a plurality of springs acting in substantially the same direction against different portions of the last mentioned guide to yieldingly resist the movement thereof longitudinally of the vehicle.

16. The combination of a railway flat car having transverse guideways in the form of upwardly facing channels with diverging side walls and springs operatively engaging the channels individually in a manner to yieldingly position said channels against movement lengthwise of the car, whereby a body having a rail on the underside may be lowered into place, and the rail thereof coacting with one of the walls of the channel to shift the channel and body into registering position.

17. The combination with a car having a transverse guideway therein in substantially the same plane as the floor of the car adapted to receive a rail on the base of a container, and horizontally extending springs disposed in the same plane as the car floor coacting with the guideway and the edges of the car floor to resist movement of the guideway.

18. The combination with a railway car channels extending transversely of the car and movable longitudinally of the car, resilient means to normally position said channels, cover plates secured to the car floor and overlapping said channels to prevent vertical movement of the channels relative to the car floor, a removable freight container having rails secured to its underside to engage such channels, and means to secure said rails to said channels to restrain the container from vertical movement relative to the channels and the car.

19. A removable freight container having rails on its underside arranged to engage a platform or carrier, said rails comprising a U-shaped pressed metal form, provided with flanges arranged to be secured to the underside of the body and bars secured to the bottom and side walls of the rails adjacent their opposite ends and arranged to coact with a locking mechanism to secure the body to the carrier or the platform.

20. The combination of a railway car, a demountable freight container, cooperating transverse guides on the car and container to guide the container in horizontal movement to or from the car, and individual spring means associated with each of said guides for yieldingly and individually resisting the movement of said guides in a direction longitudinally of the car.

21. The combination of a railway car, a plurality of transverse upwardly facing guides adapted to receive and operatively embrace positioning members on demountable bodies each independently supported thereon capable of limited movement bodily longitudinally of the car, and a plurality of springs acting against spaced areas of the guide and resisting movement thereof in one direction.

22. The combination of a vehicle having a plurality of parallel channels adapted to receive rails rigidly mounted on the undersides of demountable bodies, said channels being independently shiftable on the vehicles, springs for resisting movement of the channels, a locking device carried by each channel and shiftable therewith, and adapted to coact with a corresponding rail on the body to lock the same to the channel, operating rods for the respective locking devices suitably connected therewith and leading to the side of the car.

23. The combination of a railway flat car having a transversely arranged channel thereon, a locking device mounted on the channel and adapted to coact with a rail rigidly mounted on the underside of a demountable body when said rail occupies the channel, a rod connected with the locking devices, supported in fixed position relative to the channel and extending to the side of the car, and an operating lever on the end of said rod.

24. The combination of a railway car, having individually movable transverse guideways on the top side thereof, a demountable body having elongated rail members on its bottom side movable transversely relative to the car in the guideways thereof, and opposed springs on the car acting against opposite sides of the respective guideways to enable the body to have a limited movement longitudinally of the car while supported in said guideways.

25. The combination of a railway car having upwardly facing open ended channels, a demountable body having skid rails on its under side adapted to be slidably received by said channels, whereby said body may be slid to and from the vehicle, said channels having oppositely disposed openings in their side walls and a locking mechanism adapted to engage the skid rails to restrain the body from vertical and horizontal movement relative to said channels, including a pair of pivotally mounted hook members arranged to be projected through said openings and engage the rails, and means for moving said hook members into and out of locking engagement with said rails.

26. The combination of a railway flat car, having a transfer guideway mounted for movement longitudinally of the car and below the floor surface thereof, yielding means to resist said movement, a demountable body having a rail occupying the guideway and adapted to slide lengthwise therein in a horizontal direction, and positive locking means between the rail and guideway.

27. The combination of a vehicle having a plurality of parallel channels, demountable bodies having rails rigidly mounted on their undersides for engagement with the channels, said channels being independently shiftable on the vehicle, springs for resisting movement of the channels, and a locking device carried by each channel and shiftable therewith, and adapted to coact with a corresponding rail on the body to lock the same to the channel.

28. The combination of a railway flat car having pairs of transversely arranged channels thereon, spring means for enabling independent shifting of each channel lengthwise of the car, locking devices mounted on the respective channels and shiftable with them and bodies having rails rigidly carried on their undersides and adapted to occupy the channels, said locking devices being adapted to coact with the rails in a manner to secure the bodies on the car.

29. The combination of a freight container, having a base frame including a hollow supporting rail for the container, whereby the container may be slid on and off a vehicle, and a hook carried within the supporting rail adapted to project through a wall of the rail and enter an opening in the supporting surface of the vehicle for locking the container to such vehicle.

30. In combination, a railway carrier, a container on said carrier and having a downwardly and thence horizontally extending projection on its bottom wall, a yielding buffing device on said carrier extending upwardly and thence horizontally to overlap said horizontal projection to resist movement of said container longitudinally along said carrier and to hold said container against movement upwardly from said carrier.

31. In combination, a railway carrier, a container, a transversely extending beam extending across the bottom of said container and comprising a vertical flange and a horizontal flange at the bottom of said vertical flange, elements on said carrier upon which said beam rests, a yielding buffer device mounted on said carrier and extending upwardly above the bottom of said beam and over the top of said horizontal flange to resist movement of said container longitudinally of the carrier and upwardly from the carrier.

BENJAMIN F. FITCH.